(12) United States Patent
Webster et al.

(10) Patent No.: US 7,546,476 B2
(45) Date of Patent: *Jun. 9, 2009

(54) POWER REDUCTION IN MICROPROCESSOR SYSTEMS

(75) Inventors: Paul Webster, Cambridge (GB); Phil Endecott, Cambridge (GB); Alan Mycroft, Cambridge (GB)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/973,436

(22) Filed: Oct. 9, 2007
(Under 37 CFR 1.47)

(65) Prior Publication Data
US 2008/0046691 A1    Feb. 21, 2008

Related U.S. Application Data

(63) Continuation of application No. 10/486,301, filed on Feb. 16, 2005, now Pat. No. 7,299,369.

(30) Foreign Application Priority Data
Aug. 10, 2001 (GB) ................. 0119501.5
Aug. 8, 2002 (WO) .................. PCT/GB02/03637

(51) Int. Cl.
*G06F 1/32* (2006.01)
(52) U.S. Cl. ..................................... 713/320
(58) Field of Classification Search ............... 712/233; 713/300, 320
See application file for complete search history.

(56) References Cited

U.S. PATENT DOCUMENTS 5,790,874 A * 8/1998 Takano et al. ............... 713/320
5,854,935 A * 12/1998 Enomoto ..................... 717/159
7,299,369 B2 * 11/2007 Webster et al. .............. 713/320

* cited by examiner

*Primary Examiner*—William M Treat

(57) ABSTRACT

A method is provided for reducing the power consumption of a pipelined microprocessor system arranged to run a program stored in a memory. The method comprises duplicating at least one branch instruction so as to reduce the number of transitions on the bus between the microprocessor and the memory when the program is executed.

12 Claims, 2 Drawing Sheets

POWER REDUCTION IN MICROPROCESSOR SYSTEMS

This application is a continuation of U.S. patent application Ser. No. 10/486,301, filed Feb. 16, 2005, and issued on Nov. 20, 2007 as U.S. Pat. No. 7,299,369, which is incorporated herein by reference in its entirety.

The invention relates to power reduction in microprocessor systems comprising a microprocessor and a memory connected by at least one bus.

The methods described in this specification aim to improve the processor's average inter-instruction Hamming distance. The next few paragraphs describe this metric and explain its relation to power efficiency.

The Hamming distance between two binary numbers is the count of the number of bits that differ between them. For example:

| Numbers in decimal | Numbers in binary (inc. leading zeros) | Hamming distance |
| --- | --- | --- |
| 4 and 5 | 0100 and 0101 | 1 |
| 7 and 10 | 0111 and 1010 | 3 |
| 0 and 15 | 0000 and 1111 | 4 |

Hamming distance is related to power efficiency because of the way that binary numbers are represented by electrical signals. Typically a steady low voltage on a wire represents a binary 0 bit and a steady high voltage represents a binary 1 bit. A number will be represented using these voltage levels on a group of wires, with one wire per bit. Such a group of wires is called a bus. Energy is used when the voltage on a wire is changed. The amount of energy depends on the magnitude of the voltage change and the capacitance of the wire. The capacitance depends to a large extent on the physical dimensions of the wire. So when the number represented by a bus changes, the energy consumed depends on the number of bits that have changed—the Hamming distance—between the old and new values, and on the capacitance of the wires.

If one can reduce the average Hamming distance between successive values on a high-capacitance bus, keeping all other aspects of the system the same, the system's power efficiency will have been increased.

The capacitance of wires internal to an integrated circuit is small compared to the capacitance of wires fabricated on a printed circuit board due to the larger physical dimensions of the latter. Many systems have memory and microprocessor in distinct integrated circuits, interconnected by a printed circuit board. Therefore we aim to reduce the average Hamming distance between successive values on the microprocessor-memory interface bus, as this will have a particularly significant influence on power efficiency.

Even in systems where microprocessor and memory are incorporated into the same integrated circuit the capacitance of the wires connecting them will be larger than average, so even in this case reduction of average Hamming distance on the microprocessor-memory interface is worthwhile.

Processor-memory communications perform two tasks. Firstly, the processor fetches its program from the memory, one instruction at a time. Secondly, the data that the program is operating on is transferred back and forth. Instruction fetch makes up the majority of the processor-memory communications.

The instruction fetch bus is the bus on which instructions are communicated from the memory to the processor. We aim to reduce the average Hamming distance on this bus, i.e. to reduce the average Hamming distance from one instruction to the next.

In a non-pipelined processor, each instruction is executed completely before the processor begins to execute the next one.

When a processor is pipelined, it will have a number of instructions in various states of simultaneous execution. Depending on the depth of the pipeline, one or more instructions will have been fetched from program memory before the current instruction is executed. For example, in a typical four-stage pipeline:

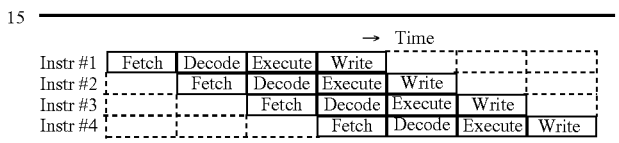

By the time instruction #1 reaches the execute stage, instruction #2 has already been fetched.

For sequential program execution, this parallelism helps increase the instruction throughput of the processor, as one instruction completes execution on every clock cycle. However, when the executed instruction causes a change in the flow of execution (such as a branch or a jump), there is an unwanted instruction from the location after the branch that will have been fetched prior to the time the branch instruction is executed. Some processors may simply execute this instruction; this is called a delayed branch.

This invention applies to those processors that choose to discard this instruction instead. When the branch is taken, the fetched instruction is cancelled, for example by internally converting it into a no-operation instruction.

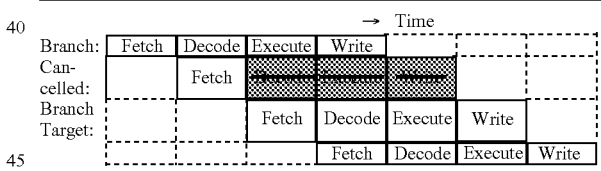

In a deeper pipeline, more than one instruction may be in the process of being decoded for execution, so more than one instruction may need to be cancelled.

According to the invention there is provided a method of reducing the power of a microprocessor system, a program, and a reduced power microprocessor system as set out in the accompanying claims.

Embodiments of the invention will now be described, by way of example only, with reference to the accompanying figures.

The accompanying figure shows a microprocessor system 2 suitable for implementation of the invention. The microprocessor system 2 comprises a microprocessor 4 connected to a memory 6 by a bus 8. The microprocessor 4 and memory 6 may of course be incorporated into the same integrated circuit.

Consider the activity on the instruction bus for the branch example given above. When the second instruction is fetched, there will be a number of bit transitions, $T_1$. Similarly, when the target of the branch is fetched, there will be a second set of transitions $T_2$. When the branch is taken, the second instruction is thrown away, so no useful work is obtained for the bit transitions. We would like to eliminate the number of transitions 'wasted' when fetching the second instruction. We conclude that, in the cases when a branch is taken, it is better to fill the subsequent instruction in the program with a replicate copy of the branch instruction.

The second instruction will never be executed, as it will be cancelled internally. By duplicating the previous branch, the bit pattern will be identical to the previous one, so there will be no transitions on the instruction bus.

As well as these unconditional branches, there are also branches that are conditional on the result of a previous operation. In this case duplication is still possible, but the decision whether or not to replicate the branch depends on the relative frequency of when the branch is taken.

Figure 1:
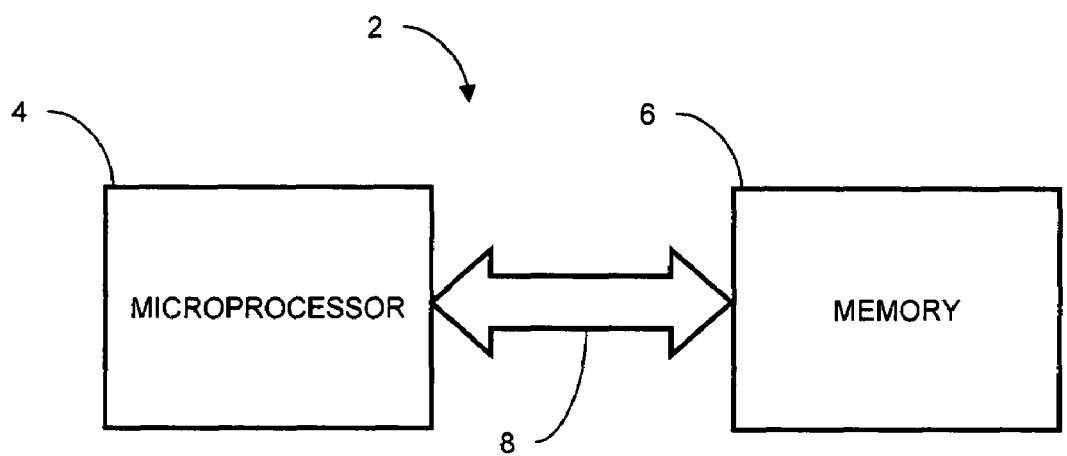
FIG. 1 is a schematic diagram of a microprocessor and memory in accordance with the invention.
Figure 2:
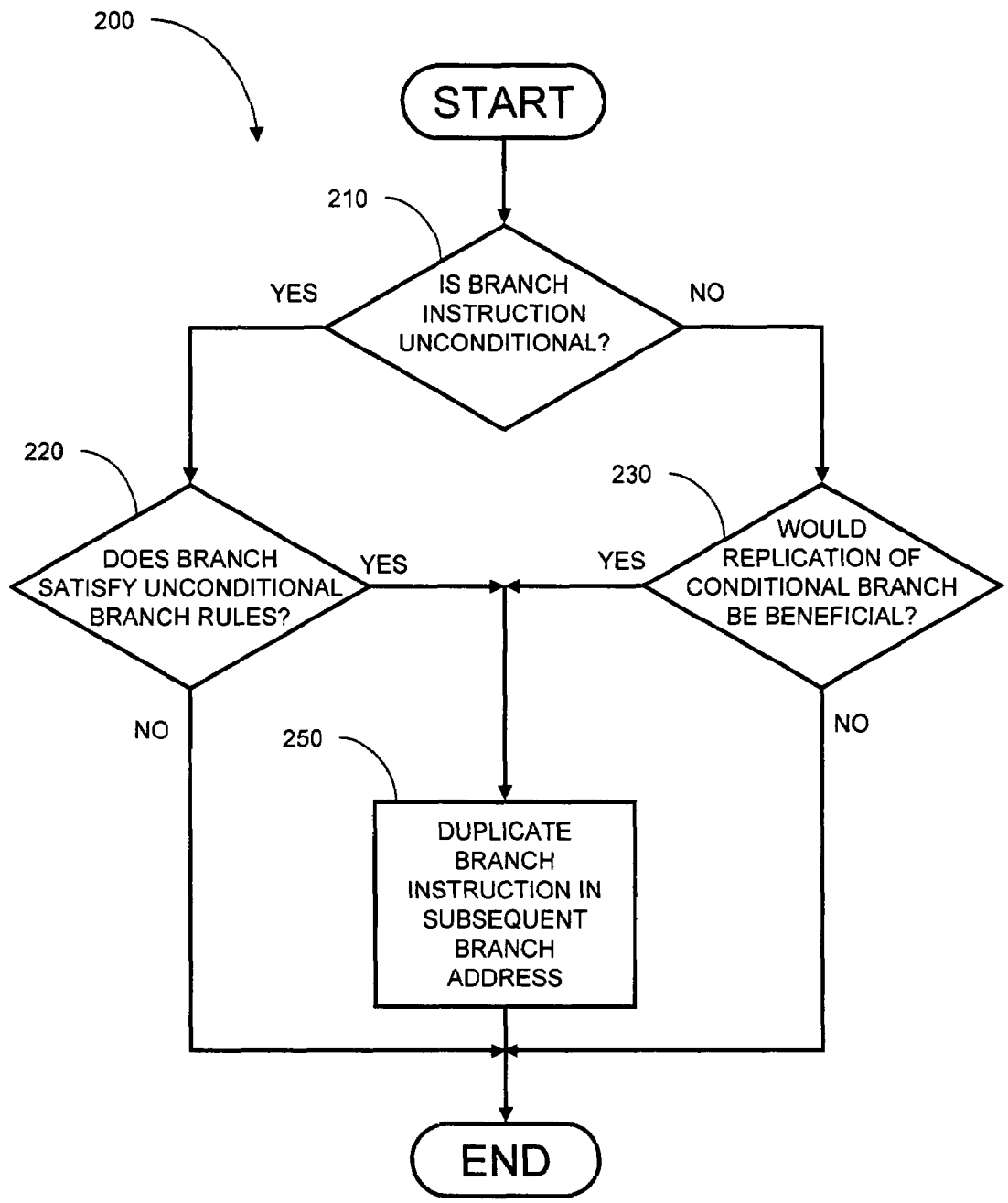
FIG. 2 is a block diagram showing a method according to one embodiment of the invention.

Both of these cases will now be considered in more detail, as described with reference to a method 200 shown in FIG. 2, which considers both conditional and unconditional branch instructions (step 210).

The unconditional branches that can be replicated (step 220) include the early exit portion of a loop, or the jump back to a saved return address from a function call. It does not include jumps to subroutines, as subroutines return to the point from which they were called and any duplication would cause them to be called multiple times.

Unconditional branches are always taken, so they should always be replicated (step 250) to minimise power. When generating the code, each instruction can be output 'n' times, where 'n' is the depth of the pre-fetch, or branch shadow, in the instruction pipeline. Care must be taken that the address or offset contained in the immediate field of the jump is the same in all cases.

Consider the following code fragment, complete with assembled bit patterns:

|     | movi | %0, #0       | 00001000000000000000000000000000 |
|-----|------|--------------|----------------------------------|
|     | movi | %1, #1       | 00001000000000010000000000000001 |
| L1: | st.b | (%2), %1     | 01000100010000010000000000000000 |
|     | st.b | (%2), %0     | 01000100010000000000000000000000 |
|     | jmp  | L1           | 01111011111111111111111111110100 |
| L2: | addi | %0, %0, #−10 | 00010000000000001111111111110110 |

For every iteration of the loop, the instruction at L2 will be fetched following the unconditional 'JMP' jump instruction. However, it will never be executed. Fetching the shadow instruction causes 15 transitions. This will then be followed by a further 19 transitions when the instruction at L1 is fetched.

Duplicating the JMP into the branch shadow produces the following code:

|     | movi | %0, #0       | 00001000000000000000000000000000 |
|-----|------|--------------|----------------------------------|
|     | movi | %1, #1       | 00001000000000010000000000000001 |
| L1: | st.b | (%2), %1     | 01000100010000010000000000000000 |
|     | st.b | (%2), %0     | 01000100010000000000000000000000 |
|     | jmp  | L1           | 01111011111111111111111111110100 |
|     | jmp  | (L1 + 4)     | 01111011111111111111111111110100 |
| L2: | addi | %0, %0, #−10 | 00010000000000001111111111110110 |

Because branch targets are specified as offsets relative to the current instruction address, the destination of the replicated branch is no longer L1 but is rather the instruction following L1 to ensure the branch offset is the same. This reduces the number of transitions by 9.

A conditional branch is not always taken, so deciding when to replicate it is harder. Conditional branches can always be replicated without affecting the overall program behaviour. If the conditional branch is taken, then the replicate instructions in the branch shadow will not be executed; if the branch is not taken, then the condition will be the same for all of the replicates and none of them will be taken. However, in this second case, every branch that is not taken will still pass through the pipeline, thereby reducing total instruction throughput.

Duplicating conditional branches will always reduce the number of transitions, albeit at the possible expense of instruction throughput.

Consider the following code:

| L1: | ld.bu | %0, (%1)     | 01000000001000000000000000000000 |
|-----|-------|--------------|----------------------------------|
|     | st.b  | (%1), %0     | 01000100001000000000000000000000 |
|     | bnz   | %0, L1       | 01101100000000001111111111110100 |
| L2: | addi  | %0, %0, #−10 | 00010000000000001111111111110110 |

The 'BNZ' instruction is a conditional branch that jumps to the destination label if the value in the source register (in this assembler notation, %0 represents register zero) contains a non-zero value. Hence the mnemonic BNZ—Branch if Non-Zero.

When we take the branch, the number of 'wasted' transitions is 6, followed by a further 17 transitions to reach the target instruction. If we replicate the branch, then we would end up with the following code:

| L1: | ld.bu | %0, (%1)     | 01000000001000000000000000000000 |
|-----|-------|--------------|----------------------------------|
|     | st.b  | (%1), %0     | 01000100001000000000000000000000 |
|     | bnz   | %0, L1       | 01101100000000001111111111110100 |
|     | bnz   | %0, (L1 + 4) | 01101100000000001111111111110100 |
| L2: | addi  | %0, %0, #−10 | 00010000000000001111111111110110 |

In the cases where the branch is taken, the number of transitions is reduced by 6 transitions. When the branch is not taken, the number of transitions is identical to the original non-replicated program. However, the replicate branch is effectively a no-operation, so the 'exit' case of the loop will take an additional cycle to execute.

Depending on the relative frequency of the branch being taken compared to the branch not being taken, this additional execution overhead may be insignificant.

Given that duplicating infrequently taken branches will reduce instruction throughput for little power-saving benefit, some additional analysis to identify which branches should be replicated is beneficial (step 230). One way of achieving this is through the use of code profiling. Another is through the use of simple branch characteristic heuristics.

Code profiling will be discussed first.

Initially, the application is run without any branch duplication. For each conditional branch, a count is kept of the number of times the branch is taken verses when it is not taken. The code is then recompiled, but this time using the statistics from the profiler. Only the conditional branches that are taken more frequently than a threshold selected by the user can be replicated. This threshold value represents a trade-off between power saving and instruction throughput.

Branch heuristics will now be discussed.

Consider the following C code fragment:

```
  int example(int size, int *flags, int *value) {
    int loop, result;
1   size= (size<0) ? -size : size;
2   for (loop= 0; loop<size; loop++) {
3     if (*(flags++)) {
4       result += *(values++);
      }
    }
5   return result;
  }
```

Compiling this code for our example instruction set produces the following assembly code:

Example:

```
1      bnn     %0, L3      01110100000000000000000000000100
       rsubi   %0, %0, #0  01100100000000000000000000000000
   L3: cmplti  %7, %0, #1  00011000000001110000000000000001
2      bnz     %7, L5      01101000111000000000000000100000
   L7: ld.w    %7, (%1)    01010100001001110000000000000000
       addi    %1, %1, #4  00010000010000100000000000000100
3      bz      %7, L6      01101000111000000000000000001100
       ld.w    %7, (%2)    01010100010011100000000000000000
       add     %6, %6, %7  00000000110001110000000010000110
       addi    %2, %2, #4  00010000100001000000000000000100
   L6: addi    %0, %0, #−1 00010000000000011111111111111111
4      bnz     %0, L7      01101100000000001111111111100000
   L5: mov     %0, %6      00010000110000000000000000000000
6      jmpr    (% lr)      00000011111000000000001111000000
```

All of the conditional and unconditional branch instructions have been numbered. The first branch, labelled #1, is a conditional branch that is taken when there is a non-negative value in its source register. Branches #2 and #4 are also conditional branches, but this time are taken when the value in the source register is non-zero. Branch #3 is another type of conditional branch, and is taken when the value in the source register is equal to zero. Finally, branch #6 is an unconditional branch that always jumps to the destination address as specified in the source register.

The first heuristic is that branch #6 is unconditional, so it should always be replicated to save power.

A common compiler heuristic is that backward branches tend to be taken. Backward branches are branches that branch to an earlier instruction. Backward branch instructions occur in places such as the end of a loop, which is why they are often taken. This would imply branch #4 should be replicated. For an array of size 'n', branch #4 will be taken 'n−1' times. Therefore, the overhead of this optimisation is 1 wasted instruction in 'n'. However, each time the branch is taken, there will be around 18 transitions saved by not pre-fetching the instruction that will not be executed.

Branch #3 is used to check a flag. Without knowledge of the data, it is not possible to predict when this branch will be taken. Again, a common compiler heuristic is that forward branches are taken less frequently. Therefore, it would be better not to replicate this branch. This heuristic also applies to branch #1 and #2.

With code profile information, the choice of which branches to replicate would be tailored for the particular execution pattern of the test data cases. Therefore, test data must be carefully chosen to reflect the typical behaviour expected when deployed.

Adding additional instructions that will never be executed will clearly result in an increase in code size. This can be a problem when compiling code for an embedded system that typically has more limited storage resources. The impact on code size can be minimised by identifying the critical path of the program (that is, the routines that are executed the most frequently) and then only applying the branch duplications to the routines on this path.

Once again, code profiling is a powerful tool. If the basic blocks making up a function are annotated with execution counts then only those branches that are executed more than a fixed threshold would be replicated. As these routines represent the bulk of the instruction fetches, the power saved will approach the maximal amount. Any code that is not executed as frequently will not be expanded, thereby keeping the total code size down.

What is claimed is:

1. A method of reducing the power consumption of a microprocessor system which comprises a microprocessor and a memory connected by at least one bus, the microprocessor being arranged to fetch and execute instructions of a program stored in said memory, the method comprising the steps of:
fetching a binary representation of a branch instruction from the memory before a previously fetched instruction has been completely executed, wherein execution of the branch instruction can result in a non-consecutive instruction being fetched; and
fetching a duplicate binary representation of the branch instruction before the branch instruction has been completely executed, whereby the number of transitions on said bus when the program is executed is reduced.

2. A method as claimed in claim 1, wherein the duplicate binary representation of the branch instruction is discarded when the branch instruction results in a non-consecutive instruction being fetched.

3. A method as claimed in claim 1, wherein the step of fetching a branch instruction comprises fetching a conditional branch instruction.

4. A method as claimed in claim 1, wherein the step of fetching a branch instruction comprises fetching an unconditional branch instruction.

5. A method as claimed in claim 1, wherein the step of fetching a branch instruction comprises fetching a backwards conditional branch instruction.

6. A method as claimed in claim 1, further comprising the steps of:
fetching a forwards conditional branch instruction from the memory before a previously fetched instruction has been completely executed, wherein execution of the branch instruction can result in a non-consecutive instruction being fetched; and
before the forwards conditional branch instruction has been completely executed, fetching an instruction from the memory that is not a duplicate binary representation of the forwards conditional branch instruction.

7. A method of reducing the power consumption of a microprocessor system which comprises a microprocessor and a memory connected by at least one bus, the microprocessor being arranged to fetch and execute instructions of a program stored in said memory, the method comprising the steps of:
fetching a binary representation of a branch instruction from the memory before a previously fetched instruction has been completely executed, wherein execution of the branch instruction can result in a non-consecutive instruction being fetched; and fetching a binary representation of a second instruction from the memory before the branch instruction has been completely executed, a Hamming distance between the binary representations of the branch instruction and the second instruction being exactly zero.

8. A method as claimed in claim 7, wherein the second instruction is discarded when the branch instruction results in a non-consecutive instruction being fetched.

9. A method as claimed in claim 7, wherein the step of fetching a binary representation of a branch instruction comprises fetching a binary representation of a conditional branch instruction.

10. A method as claimed in claim 7, wherein the step of fetching a binary representation of a branch instruction comprises fetching a binary representation of an unconditional branch instruction.

11. A method as claimed in claim 7, wherein the step of fetching a binary representation of a branch instruction comprises fetching a binary representation of a backwards conditional branch instruction.

12. A method as claimed in claim 7, further comprising the steps of:

fetching a binary representation of a forwards conditional branch instruction from the memory before a previously fetched instruction has been completely executed, wherein execution of the branch instruction can result in a binary representation of a non-consecutive instruction being fetched; and before the forwards conditional branch instruction has been completely executed, fetching a binary representation of an instruction from the memory having a Hamming distance from the forwards conditional branch instruction greater than zero.

* * * * *